UNITED STATES PATENT OFFICE.

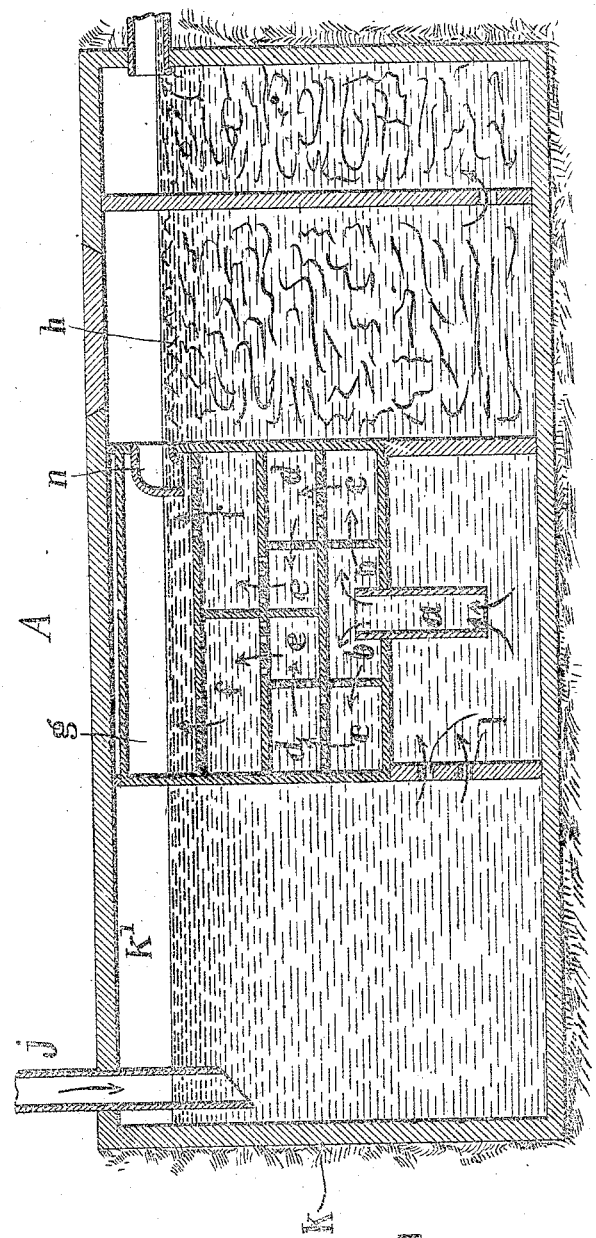

GUSTAVE ALBERT LUCAS, OF LEVALLOIS-PERRET, FRANCE.

SANITARY APPARATUS.

No. 869,001. Specification of Letters Patent. Patented Oct. 22, 1907.

Application filed December 23, 1905. Serial No. 293,062.

*To all whom it may concern:*

Be it known that I, GUSTAVE ALBERT LUCAS, of 65 Rue Vallier, Levallois-Perret, (Seine,) Republic of France, mechanician, have invented Improvements Relating to Sanitary Apparatus, of which the following is a full, clear, and exact description.

The present invention has for its object an apparatus intended for destroying all fecal matters, and liquid house refuse by automatically effecting their transformation into a colorless, inodorous and inoffensive liquid.

This apparatus is characterized by the special arrangement of an anaerobic fermentation chamber divided into a certain number of compartments in each of which the bacteria (anaerobic bacteria) due to the action of fermentation, fix themselves, develop themselves and destroy the organic germs contained in the matter to be treated; these several compartments having each solid and perforated partitions or walls so arranged that a solid partition is always opposite a perforated one; this special arrangement allows the bacteria to attach themselves on the solid partitions and to accomplish in this way entirely their work without being disturbed by the currents and passage of the liquid circulating through the perforated partitions. On coming out from this anaerobic fermentation chamber, the liquid passes through a purifying chamber in which the nitrification of the nitrogen in the previously dissolved organic matter takes place. The product issuing from this purifying chamber is a colorless inodorous and entirely inoffensive liquid as regards public health.

The present apparatus may be placed in a cesspool already constructed or in a cesspool specially constructed for this purpose.

The accompanying drawing shows by way of example a mode of practically carrying out the present system of apparatus.

The diluted matter to be treated is admitted to the fermentation chamber through the pipe *a* and enters the compartment *b* where the first degree of fermentation takes place; thence, the matter divides into two currents, as shown by the arrows, and successively passes into the lateral chambers *c, c*, then into the chambers *d, d*, passes into the central chambers *e, e*, then through the chambers *f, f*, and finally arrives into the upper chamber *g*.

As shown, the perforations which cause the several chambers to communicate are so arranged that in each chamber a solid wall or partition is always in front of a perforated one.

The apparatus being hermetic, the work of fermentation becomes increasingly efficacious by reason of the fact that the matter as it does not find a direct outlet, makes a more prolonged stay in the apparatus; furthermore, the special arrangement of the solid and perforated partitions enables the anaerobic bacteria produced under the action of fermentation, to attach themselves on the solid partitions and to thus entirely accomplish their work without being carried along or disturbed by the current of liquid circulating through the perforated partitions. During this circulation, the organic substances contained in the matter to be treated are destroyed by these bacteria. The liquid issuing from this fermentation chamber no longer contains organic matters; this liquid then passes through a filtering vat containing filtering material and adapted to purify the liquid. In advance of this fermentation chamber is arranged a receiver in which the matter is admitted through the waste pipe and in which it is diluted with the water sealing the apparatus.

The present apparatus can be placed in position either along or across the cesspool on the right hand or on the left; this change of position is effected in a very simple manner and does not necessitate a special construction for each apparatus.

What I claim is—

1. In an apparatus for the bacterial treatment of fecal matters, liquid house refuse and sewage, an anaerobic fermentation chamber, vertical and horizontal partitions dividing the latter into a series of compartments, perforations provided in some of these partitions so that opposite a perforated partition is always arranged a solid one in order to allow the bacteria to attach themselves on these solid partitions, to completely develop themselves and to entirely accomplish their work without being disturbed by the liquid current freely circulating through the perforated partitions.

2. In an apparatus for the bacterial treatment of fecal matters, liquid house refuse and sewage, a receiving chamber, an anaerobic fermentation chamber, vertical and horizontal walls dividing the latter into a series of compartments, perforations provided in some of these partitions so that opposite a perforated partition is always arranged a solid one, a communication between the lower part of the anaerobic fermentation chamber and the lower part of the receiving chamber, a purifying chamber containing filtering materials and communicating at its upper part with the upper part of the anaerobic fermentation chamber.

The foregoing specification of my improvements relating to sanitary apparatus signed by me this eleventh day of December, 1905.

GUSTAVE ALBERT LUCAS.

Witnesses:
HANSON C. COXE,
MAURICE H. PIGNET.